Figure 1:
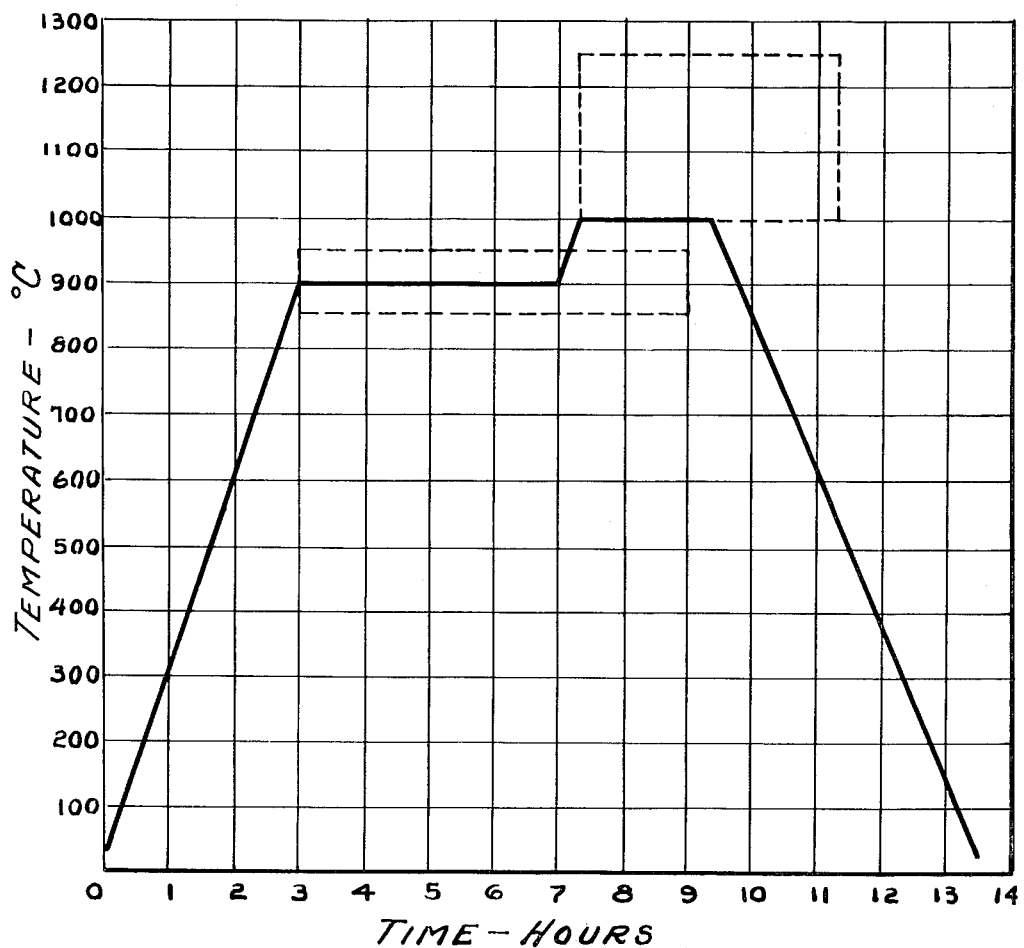

Jan. 25, 1966   S. D. STOOKEY   3,231,399
SEMICRYSTALLINE CERAMIC BODIES AND METHOD
Filed March 19, 1962   2 Sheets-Sheet 1

INVENTOR.
STANLEY D. STOOKEY
BY
ATTORNEY

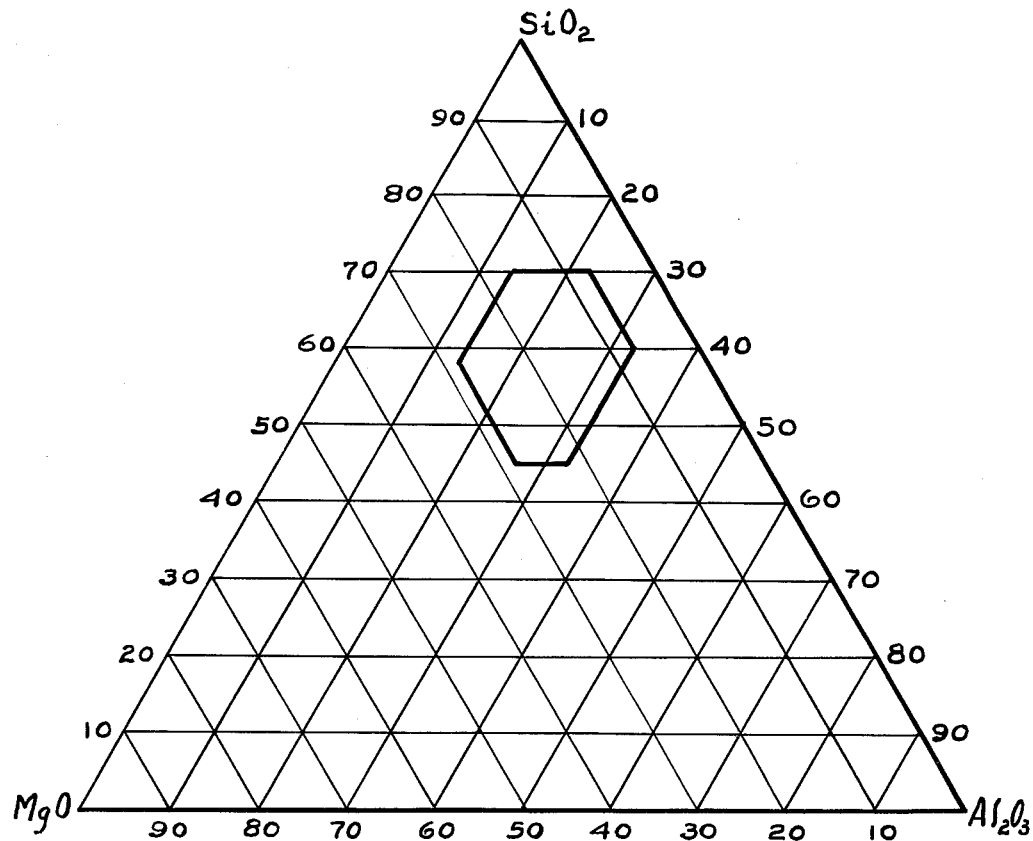

3,231,399
SEMICRYSTALLINE CERAMIC BODIES AND METHOD

Stanley D. Stookey, Corning, N.Y., assignor to Corning Glass Works, Corning, N.Y., a corporation of New York
Filed Mar. 19, 1962, Ser. No. 180,553
4 Claims. (Cl. 106—39)

This invention relates to the manufacture of semicrystalline ceramic bodies. More specifically, this invention relates to the manufacture of semicrystalline ceramic bodies consisting essential of MgO, $Al_2O_3$, and $SiO_2$.

The formation of semicrystalline ceramic bodies through the controlled crystallization by heat treatment of a glass is commonly practiced by introducing into the glass batch a nucleating or crystallization-promoting agent, melting the batch, simultaneously shaping and cooling the molten glass into a glass body, and thereafter heat treating the shaped body following a planned temperature-time schedule. This heat treatment converts the glass into a body consisting of finely-divided crystals randomly dispersed substantially uniformly throughout a glassy matrix and comprising a major proportion of the mass of the body. The heat treated article generally exhibits physical properties differing substantially from those of the original base glass.

A wide range of glass compositions has been converted into semicrystalline bodies through the use of $TiO_2$ as a nucleating or crystallization promoting agent. These compositions are set out in my United States Patent No. 2,920,971. For some applications where extremely high mechanical strength and thermal shock resistance are demanded, notably dinnerware, research has been continuous to improve the semicrystalline articles presently available in commerce.

Therefore, the primary object of this invention is to provide a method of making a semicrystalline ceramic product consisting essentially of magnesia, alumina, and silica which is extremely strong, dense, and resistant to thermal shock.

Another object of this invention is to provide such a method wherein presently available apparatus and known techniques can be used to practice the invention whereby the inherent economies and efficiencies of using known processes are possible.

My invention is based upon the discovery that stannic tin oxide ($SnO_2$) is an excellent nucleating or crystallization-promoting agent for certain $MgO \cdot Al_2O_3 \cdot SiO_2$ compositions. Moreover, not only is $SnO_2$ an effective nucleator, but the articles after heat treatment exhibit excellent strength and resistance to thermal shock.

Broadly, the new method comprises heat treating a glass body consisting essentially of about 8–28% by weight of MgO, about 14–32% by weight of $Al_2O_3$, about 45–70% by weight of $SiO_2$, and about 3–13% by weight of $SnO_2$ by heating it to about 850°–950° C. and holding it within this range for about 1–6 hours to initiate crystallization and then raising the temperature to 1000°–1250° C. and holding it thereat for about ½ to 4 hours until the desired crystallization is present. My preferred compositions, i.e., those compositions yielding bodies having the highest mechanical strength, while retaining good resistance to thermal shock, are glass-forming batches containing about 23–25% MgO, about 16–18% $Al_2O_3$ and about 48–50% $SiO_2$, to which about 10–11% $SnO_2$ is added.

The above-cited ranges of MgO, $Al_2O_3$, $SiO_2$, and $SnO_2$ have been found to be critical to the invention. Where the MgO content is less than that set out, the melt crystallizes upon cooling such that a glass body cannot be obtained for subsequent heat treatment. Where the MgO content is excessive, incompatible crystal phases tend to be formed which lower the resistance of the body to thermal shock and may even cause the article to spall during the heat treating cycle. Where more $Al_2O_3$ is present than set out in the above range, a glass results which is too viscous and difficult to melt at temperatures compatible with present day refractories. Nevertheless, sufficient $Al_2O_3$ must be present to insure high strength and durability. Likewise, an excessive amount of $SiO_2$ gives a glass which is too viscous to melt properly. Sufficient $SnO_2$ must be added to provide adequate nucleation but more than about 13% by weight unnecessarily increases the cost of the batch and also hazards crystallization of the melt upon the initial cooling.

Other compatible metal oxides may also be present provided their total amount does not exceed about 10 weight percent of the batch. Such compatible metal oxides include $TiO_2$, $B_2O_3$, ZnO, and BaO. $TiO_2$ and $B_2O_3$ are fluxes which aid in melting the batch and also promote crystallization during the heat treating process. These two ingredients should preferably be present in an amount less than the $SnO_2$ or a serious diminution in the mechanical strength of the product may result. The ZnO and BaO act to lower the expansion and thereby improve the thermal shock resistance of the body.

The increase in strength which is developed in $SnO_2$-nucleated glasses of $MgO \cdot Al_2O_3 \cdot SiO_2$ compositions is not thoroughly understood, but it has been observed that a thin compressive layer is formed in the surface of the body. Presumably, this arises from appreciable crystallization at the surfaces which develops from surface nucleation, while all of the interior crystallization develops from volume nucleation. It is well-known in the ceramic art that, where a compressive stress in and parallel to the surface of a ceramic body is present, the modulus of rupture of the body is substantially increased.

The presence of a compressive layer was demonstrated by firmly cementing a ¼-inch heat treated bar to a flat plate. The bar was then ground to a thickness of about ⅟₁₆-inch and the surface of the bar tested along its length with a straight edge to insure that it was flat. The heat treated bar was then released from the plate and again checked with a straight edge. It was found that the bar was slightly curved, the ground side being concave. This result can best be explained by considering the surface of the bar as fired to be under a compressive stress.

To study the compressive layer further, numerous X-ray diffraction analyses were conducted of this zone. However, in only one instance, viz., Example 3 of Table I set out below, was the presence of a low expansion crystal phase (cordierite) detected in the surface layer but not in the interior. Hence, although the existence of a compressive layer can be demonstrated by the mechanical test described above, its character has not been explained except in the case of Example 3 noted above.

Table I illustrates examples having the compositions of glasses falling within the aforementioned ranges calculated from their respective batches to the oxide basis in weight percent, exclusive of impurities which may be present in the batch materials.

Each of the glass-forming batches was ball milled for as long as 6 hours and even longer prior to melting to aid in obtaining a homogeneous melt. The batches were then melted for at least 4 hours at about 1550° C. in crucibles, pots, or tanks depending upon the quantity of product desired. The melts were then poured into molds and cooled as a glass to room temperatuure. The shapes were then placed in a furnace and heated at about 5° C./minute to the temperature of the first level of heat treatment, as recorded in Table I, and held thereat for the proper time. The furnace temperature was then raised at 5° C./minute to the second level of heat treatment after which the shapes were allowed to cool to room temperature at a rate commensurate with their resistance to thermal shock.

It will be understood that slower or faster heat-up schedules may be used where very thick or very thin shapes, respectively, are involved. The 5° C./minute rate has been found to be satisfactory in many instances in preventing breakage due to thermal shock and excessive deformation of the glass article as it is being heated beyond its softening point and before crystallization has progressed far enough to support the body. The crystallization of the glass during the heat treating step proceeds more rapidly as the temperature approaches the liquidus of the crystalline phase. However, in the early stages of crystallization, the proportion of glassy matrix is large and the article is deformable if its temperature is raised too rapidly.

As noted above, the rate of cooling the crystalline body to room temperature is dependent upon its resistance to thermal shock. Here, again, the size of the body influences the rate chosen. A 5° C./minute cooling has been found adequate in most instances although much faster rates are possible with relatively small articles. Frequently, the heat in the heat treating furnace will merely be cut off and the funace allowed to cool at its own rate.

Furthermore, where fuel economies and speed in obtaining the final crystalline product are sought, the glass shapes need not be cooled to room temperature and then reheated. (The glass bodies are cooled to room temperature to permit a visual inspection thereof.) Rather, the glass article may be cooled below the transformation point, i.e., the temperature at which the liquid melt is considered to have been transformed into a glass solid, generally in the vicinity of the annealing point of the glass, and the desired heat treatment then conducted. The annealing points of the glasses herein range from about 700°–800° C.

Another embodiment of the invention which will produce a satisfactorily crystalline body comprises raising the temperature of the glass shape over the transformation point and holding thereat for a time sufficient to attain the desired crystallization. Where a relatively low temperature is utilized, say around 850° C., a period of time of 24 hours and even considerably longer may be required, while if a higher constant temperature is employed, the holding time will be reduced. However, here again, the rate of heating the body must be adjusted so the rate of crystallization will substantially balance the decrease in viscosity of the body, thereby preventing excessive deformation as the article is heated beyond the softening point of the glass.

My preferred practice comprehends a two-step heat treatment, as I have found total deformation to be less where a short hold at a lower temperature is used to initiate crystallization.

My invention, then, consists of three essential steps: (1) melting the glass-forming batch; (2) simultaneously cooling the melt below the transformation point and shaping it into a glass body; and (3) heat treating the glass body at about 850° C., but not more than about 1250° C., for a time sufficient to attain the desired crystallization.

Table I also records the moduli of rupture (p.s.i.), densities (gr./cc.), and coefficients of thermal expansion ($\times 10^7$) of the semicrystalline bodies as well as the crystal phases present, as determined by X-ray diffraction analysis. Although physical properties and crystal structure were not obtained in every composition studied, each of the following examples represents a batch which was actually melted and heat treated to yield a satisfactory product.

Table I

|  | 1 | 2 | 3 | 4 | 5 |
|---|---|---|---|---|---|
| $SiO_2$ | 51.5 | 50.3 | 49.5 | 49.2 | 48.7 |
| $Al_2O_3$ | 18.1 | 17.8 | 17.5 | 17.5 | 17.3 |
| $MgO$ | 26.4 | 25.2 | 23.8 | 24.2 | 23.9 |
| $SnO_2$ | 4.0 | 7.0 | 9.0 | 10.0 | 11.0 |
| Hrs | 2 | 4 | 4 | 4 | 4 |
| °C | 850 | 900 | 900 | 900 | 900 |
| Hrs | 2 | 2 | 2 | 2 | 2 |
| °C | 1,250 | 1,000 | 1,150 | 1,000 | 1,000 |
| Mod. of Rupture | 14,400 | 24,750 | 26,400 | 42,200 | 45,100 |
| Density | 2.8514 | 3.1031 | 2.8352 | 3.1150 | 3.0350 |
| Expansion | 72.6 | 74.3 | 36.5 | 72.6 | 78.8 |
| Crystal Phases | -------- | (¹) | (²) | (¹) | (³) |

|  | 6 | 7 | 8 | 9 | 10 |
|---|---|---|---|---|---|
| $SiO_2$ | 48.3 | 47.8 | 55.9 | 56.8 | 50.7 |
| $Al_2O_3$ | 17.1 | 17.0 | 19.8 | 22.7 | 25.7 |
| $MgO$ | 23.8 | 23.5 | 14.4 | 10.9 | 12.1 |
| $SnO_2$ | 12.0 | 13.0 | 6.9 | 7.0 | 8.0 |
| $TiO_2$ | -------- | -------- | 5.0 | -------- | 3.0 |
| $B_2O_3$ | -------- | -------- | -------- | 1.0 | -------- |
| $BaO$ | -------- | -------- | -------- | 1.0 | 2.0 |
| $ZnO$ | -------- | -------- | -------- | 1.0 | -------- |
| Hrs | 4 | 4 | 4 | 3 | 1 |
| °C | 900 | 900 | 880 | 950 | 950 |
| Hrs | 2 | 2 | 4 | 1 | 3 |
| °C | 1,000 | 1,000 | 1,150 | 1,100 | 1,150 |
| Mod. of Rupture | 24,700 | 24,700 | 9,400 | 17,800 | 16,500 |
| Density | 3.1333 | 3.0868 | 2.6367 | 3.0624 | 2.8215 |
| Expansion | 71.7 | 70.5 | 37.8 | 57.6 | 41.3 |
| Crystal Phases | (¹) | (¹) | (⁴) | -------- | -------- |

¹ Cassiterite $MgO \cdot SiO_2$.
² Cassiterite Cristobalite Cordierite.
³ Cassiterite Cristobalite $MgO \cdot SiO_2$.
⁴ Cassiterite Cristobalite.

The batch materials for the above glasses may comprise any materials, either oxides or other compounds, which, on being fused together, are converted to the desired oxide compositions in the desired proportions.

In some instances, a fining agent was added to the glass batch. This fining agent was generally $As_2O_3$ and was normally added in an amount up to about 1%. The $As_2O_3$ was omitted from the table for convenience, since the residual amount remaining in the glass is too small to have any material effect on its fundamental properties.

Although in each of the above examples the glass was shaped by pouring into molds, it will be understood that any of the conventional glass forming methods such as pressing, rolling, blowing, or spinning are likewise applicable to my invention.

As Table I illustrates, my invention provides a method for forming semicrystalline ceramic bodies of $MgO$, $Al_2O_3$, and $SiO_2$ which are extremely dense, strong, and resistant to thermal shock and which can be practiced using apparatus and techniques well-known to the ceramic art. The crystal content of the bodies is at least 30% by weight and generally on the order of 50 weight percent, this depending upon the extent to which components of the batch are adaptable to the formation of crystalline phases. The crystals are very fine, preferably all substantially finer than 30 microns in diameter, and are randomly oriented in the glassy matrix.

FIG. 1 is a time-temperature chart illustrating a specific heat treating schedule, i.e., after the batch has been melted, shaped, and cooled to room temperature, the body is raised to 900° C. at a rate of 5° C./minute, held thereat for a period of 4 hours, the temperature of the body then raised to 1000° C. at a rate of 5° C./minute, held thereat for a period of 2 hours, and thereafter cooled to room temperature at 5° C./minute.

The areas enclosed within the dotted lines designate the temperature and time ranges encompassed in the invention.

FIG. 2 sets out the ranges of the compositions of $SiO_2$, $Al_2O_3$, and $MgO$ included in my invention.

What is claimed is:

1. The method of manufacturing a semicrystalline ceramic body comprising the steps of melting a glass-forming batch consisting essentially, by weight, of about 48–

50% $SiO_2$, about 16–18% $Al_2O_3$, about 23–25% MgO, and about 10–11% $SnO_2$, simultaneously cooling the melt below the transformation point of the melt and shaping a body therefrom, thereafter exposing said body to a tempertaure range of about 850°–950° C. for about 1–6 hours, increasing the temperature of said body to about 1000°–1250° C., maintaining thereat for about 0.5–4 hours, and then cooling to room temperature.

2. A semicrystalline ceramic body consisting essentially of a multiplicity of fine-grained, randomly-oriented, inorganic crystals dispersed in a glassy matrix, said crystals being formed by crystallization in situ from a glass body consisting essentially, by weight on the oxide basis, of about 48–50% $SiO_2$, about 16–18% $Al_2O_3$, about 23–25% MgO, and about 10–11% $SnO_2$ said glassy matrix consisting essentially of the uncrystallized portion of the glass remaining after the crystallization of said crystals.

3. A semicrystalline ceramic body according to claim 2 wherein substantially all of said crystals are finer than 30 microns in diameter.

4. A semicrystalline ceramic body according to claim 2 wherein said crystals comprise at least 30% by weight of said body.

References Cited by the Examiner
UNITED STATES PATENTS

| | | | |
|---|---|---|---|
| 2,876,120 | 3/1959 | Machlan | 106—39 |
| 2,920,971 | 1/1960 | Stookey | 106—39 |

OTHER REFERENCES

Hinz: Chem. Abstracts, vol. 53, item 12615c (1959).
Weyl et al.: Glass Industry, volume 42 (January 1961) (pages 23–25, 28, 49).

TOBIAS E. LEVOW, *Primary Examiner.*